Oct. 10, 1967   E. W. FARMER   3,346,221

CRITICALLY DAMPED VIBRATION SYSTEM

Filed Feb. 4, 1965

INVENTOR.
EVERETT WALTER FARMER
BY
ATTORNEY

United States Patent Office 3,346,221
Patented Oct. 10, 1967

3,346,221
CRITICALLY DAMPED VIBRATION SYSTEM
Everett Walter Farmer, Reeds Ferry, N.H., assignor to Sanders Associates, Inc., Nashua, N.H., a corporation of Delaware
Filed Feb. 4, 1965, Ser. No. 430,312
19 Claims. (Cl. 248—24)

ABSTRACT OF THE DISCLOSURE

Apparatus is disclosed herein for a vibration isolator capable of providing critical damping to vibration systems. The apparatus comprises an assembly in which a part is isolated from external vibrations and shock by means of an open-cell foam isolator impregnated with a damping material.

---

Figure 2:
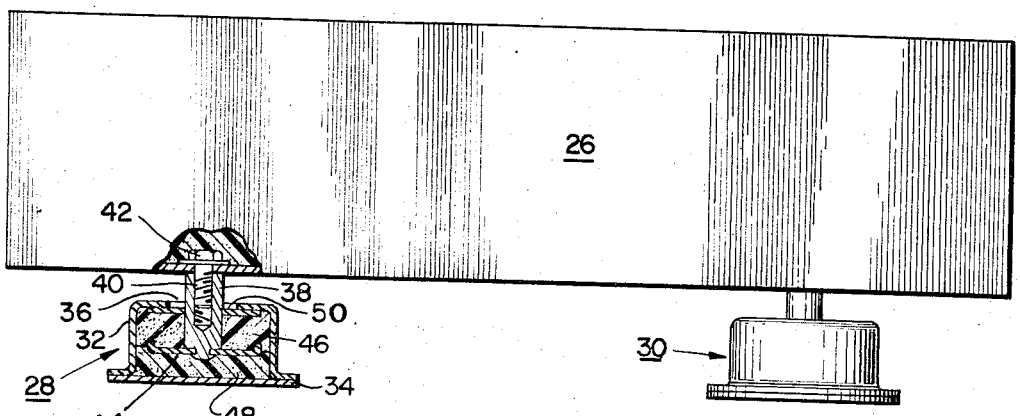

This invention relates to a vibration isolator. More specifically, it relates to an assembly in which a part is isolated from external vibrations and shock by means of an open-cell foam isolator impregnated with a damping material. The dimensions, mass and other physical characteristics of the isolator and the parts isolated thereby are proportioned for substantially critical damping of the system. The critical damping, in turn, maximizes attenuation of the vibrations propagating toward the isolated parts.

Isolators of various types are widely used to protect sensitive parts subject to environments characterized by bothersome vibrations. The sensitivity may be characterized by susceptibility to damage by the vibrations. Or, in the case of certain electronic components, it may be exhibited by the generation of spurious signals.

Over the years vibration isolators have taken many forms. These include widely used springs and rubber shock mounts, as well as distributed isolators such as masses of foam materials. While these isolators all serve to inhibit the transmission of most vibrations, the vibrating systems in which they are incorporated exhibit resonances having much the reverse effect. At the characteristic frequencies of such resonances the vibrations may be substantially amplified instead of attenuated. In some cases, the vibrating system may be designed to have a resonant frequency which differs substantially from any of the vibrational frequencies to be encountered. However, this is not always practical or even possible, since some environments imposed vibrations over a fairly broad frequency spectrum, an example of this being shock or impulse type vibrations. In such cases, resonances may be excited, with the result that undue mechanical stress is placed on the parts which should be protected from vibration and shock.

Accordingly, it is a principal object of the present invention to provide an improved vibration and shock isolating system.

A further object of the invention is to provide a vibration and shock isolating system which exhibits improved attenuation of vibrations propagating toward a part to be protected from vibration. A more specific object is to provide a critically damped system of the above type which does not exhibit resonances causing amplification of the vibrations at particular frequencies.

Yet another object of the invention is to provide a vibration isolating system exhibiting mechanical isolation between two or more parts of the system.

Another object of the invention is to provide a system of the above type which is characterized by relatively low cost construction and a high degree of reliability.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 1:
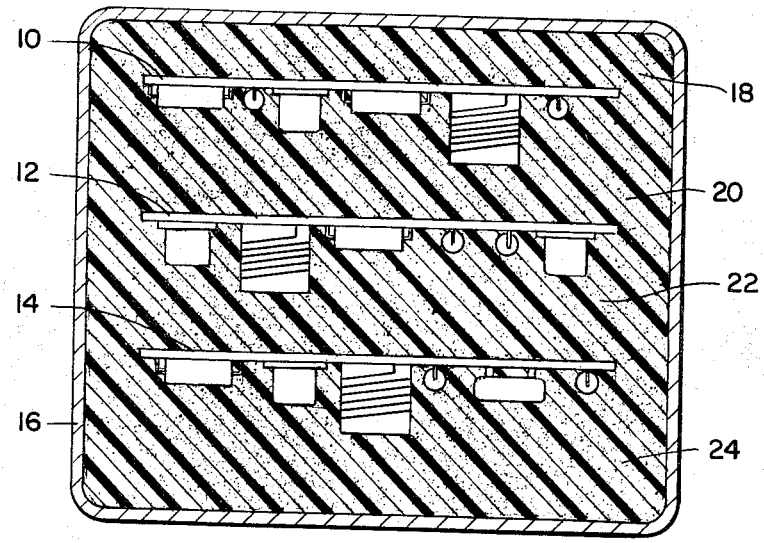
Figure 3:
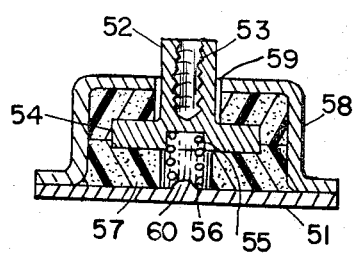

For a fuller understanding of the nature and objects of the invention, reference should be had to the following detailed description taken in connection with the accompanying drawing, in which:

FIG. 1 is an end view, partly cut away and partly in section, of an electronic assembly incorporating the invention, and FIG. 2 is a view, partly in section, of a load mounting arrangement embodying the invention, and FIG. 3 is an end view, partly cut away and partly in section, of another vibration and shock isolator incorporating the invention.

In general, the invention makes use of open-cell foam material such as polyurethane, as an isolating medium, with the cell walls of the foam coated with a damping material. The foam material has considerably elasticity, so that after it is compressed or stretched and then released, it will return to its original shape. The damping material with which the foam is impregnated retards changes in the shape of the material through the mechanism of internal friction and thus, in effect, it increases the time constant associated with expansion and contraction of the material.

The impregnated foam is disposed between the source of vibrations and the parts to be isolated therefrom. In a normal installation it is connected directly to the isolated part and, in analyzing operation of an isolator, this part and the isolating foam may be considered together as a vibration system. The system has a resonant frequency and the parameters of the system are controlled in such manner that it is critically damped. This markedly increases the isolation between the protected part and the source of vibrations, particularly at the resonant frequency. Thus, greatly improved isolation is obtained in cases where the vibrations are of a random or broad-spectrum nature, with frequency components at or near the resonant frequency.

Assuming a simplified example involving a single degree of freedom, the natural frequency, $f_n$, of a vibratory system is given by $$f_n = \tfrac{1}{2}\pi \sqrt{\frac{k}{m} - \left(\frac{r}{2m}\right)^2} \tag{1}$$

where, $k$ is the spring constant of the system,
$m$ is the effective mass, and
$r$ is the damping or loss of parameter.

By definition, if the quantity under the radical sign of Equation 1 is equal to 0, resonant vibratory motion will be impossible. This condition exists where $$r = \sqrt{4km} \tag{2}$$

The mass, $m$, of the system consists largely of the mass of the parts to be protected from vibration and, therefore, this parameter may be considered as a fixed quantity in most situations. This leaves the damping, $r$, and the spring constant, $k$, as the variables which can be adjusted to provide critical damping. The spring constant is proportional to the bulk modulus, $G$, of the foam and $r$ is a function of such factors as the damping material which impregnates the foam and the amount of the damping material used. Therefore, both of these $k$ and $r$ can be controlled through control of the manufacture of the impregnated foam.

However, it will generally be found desirable to manufacture a relatively large quantity of foam having a single value of G and uniform damping characteristics. The spring constant and the damping can then be adjusted by the control of the size and shape of the body of foam to which the isolated part is connected. Specifically, the spring constant, $k$, is related to the bulk modulus G by $$k = GA/h \qquad (3)$$

where,

A is the area of the foam body in the cross section perpendicular to the direction of vibration, and
$h$ is the thickness of the foam body in the direction of vibration.

Thus, adjustment of the area or thickness of the foam can be used to control the spring constant. The damping is believed to be related to the volume of the foam body and, therefore, adjustment of area or thickness (or both) can be used to control both $k$ and $r$ to provide the critical damping relationship given in Equation 2.

Ordinarily it is desirable to arrange the vibrating system for a resonant frequency, in the absence of damping near the low frequency end of the vibrational frequency spectrum. The critical damping then reduces the mechanical coupling at this frequency and the reactive filtering action of the system presents alternate transmission of vibrations at higher frequencies.

It should be understood, however, the invention provides improved isolation over such prior techniques as friction damping and hysteresis damping in uniform elastomeric materials even in the absence of critical damping.

Another important advantage of the use of impregnated foam in one embodiment is the inclusion of both the damping and elastic components of the system in a single body of material. This should be contrasted with arrangements in which the spring and damping functions are supplied by separate parts. It is apparent that the present invention results in a simpler and lower-cost isolating system in many applications. However, it is possible to make use of the impregnated foam in conjunction with a static load-carrying spring to accomplish the same objectives.

Impregnated foams which have been found suitable for use in accordance with the invention are described in U.S. Patent 2,964,424, which issued December 13, 1960. In general, the material disclosed in this patent is polyurethane foam impregnated with asphaltic bitumen as a damping material. Other foam materials and other damping materials are also suitable. For example, polysulfide has been found to have superior characteristics at low temperatures where the bitumen tends to harden.

As a general principle, the materials which are suitable for use in accordance with the invention are impregnated foams which have the following characteristics:

(1) a long duration time constant,
(2) a foam and an impregnant which sticks to the walls of the cells making up the foam and to itself,
(3) a foam which has cells which are stronger than the adhesive forces between the cells, due to the impregnant; and, for wide usage under adverse environmental conditions, one whose characteristics are even over an extended temperature range.

As a further general rule, the foam should be of open cell type; however, some closed foams could be used if the impregnants were mixed in before the material is first made into a foam. Suitable foam materials such as polyurethane, silicone rubber, natural rubber, polyvinylchloride and others can be utilized.

As for the impregnants, they should be, generally speaking, of the nonhardening visco-elastic type.

The following examples of the type of impregnants used with the aforementioned foams are to be considered illustrative and not limiting:

(1) Polysulfide, commonly referred to as Thiokol rubber.
(2) Polyisobutylene, commonly referred to as butyl rubber.
(3) Polyisoprene, commonly referred to as natural rubber.
(4) Polychloroprene, commonly referred to as neoprene.
(5) Butadiene-acrylonitrile elastomer, commonly referred to as Buna N rubber.
(6) Polyacrylate.
(7) Butadiene-styrene elastomer, commonly referred to as Buna S rubber.
(8) Silicone elastomers, commonly referred to as silicone rubber.
(9) Polyurethane elastomers, commonly referred to as urethane rubber.
(10) Fluorinated elastomers, commonly referred to as Viton.

Compatible combinations of any of the above foams with the above referred to impregnants are possible and any combination which produces the above referred to characteristics is considered suitable for use in accordance with the invention.

In utilizing the above impregnants, they are usually dissolved in a suitable solvent applied to the foam and the solvent driven off.

In FIG. 1 I have illustrated the manner in which an electronic assembly may be isolated from external vibrations and shock by means of the present invention. Illustratively, the assembly comprises three mounting boards, 10, 12 and 14, each of which carries a number of electronic components interconnected by printed circuit techniques. The boards 10–14 are contained within a housing 16. The housing 16 is exposed to a vibrational environment and, therefore, may be considered as the source of the vibrations for the components disposed within it.

The space within the housing 16 is substantially filled with damped foam of the type described above, the foam being in the form of slabs, 18, 20, 22 and 24. The individual foam slabs are preferably bonded to the housing 16 over the areas where they contact it. They are preferably also suitable bonded to the mounting boards 10–14 and the components mounted thereon. Desirably, the only mechanical coupling between the mounting boards and the housing 16 is by way of the foam slabs 18–24 and, therefore, any electrical leads extending between the mounting boards and the housing should be of a relatively limp construction.

Optimum mechanical isolation between the mounting boards 10–14 and the housing 16 is obtained by critical damping of the vibratory system comprising the mounting boards and the foam slabs 18–24. Generally, the dimensions of the foam slabs providing critical damping can be roughly calculated from previously ascertained bulk modulus and damping properties of the foam. The calculations can then be followed by a simple cut-and-try procedure to arrive at the exact dimensions for critical damping.

FIG. 2 illustrates the manner in which the invention can be embodied in an isolator of the shock mount variety. A housing 26, containing parts to be isolated from external vibrations, is supported by a plurality of isolators, two of which are shown at 28 and 30. The isolator 28, which is shown in detail, is similar in construction to the other isolators supporting the housing 26.

More specifically, the isolator 28 is housed in an inverted cup-shaped case 32 closed off at the bottom by a bottom plate 34. The case 32 is provided with an upper aperture 36, through which a load-receiving stud 38 extends downwardly into the interior of the isolator. The stud 38, which may be threaded as shown at 40 to facilitate attachment to the housing 26 by means of a screw 42, is fastened at its lower end to a load-distributing plate 44. The plate 44, in turn, is sandwiched between impregnated foam slabs 46 and 48 of the type described above.

The slabs 46 and 48 are preferably bonded to the plate 44, the stud 38, the case 32 and the plate 34 over the areas where they contact these parts. The upper slab 46 may also be bonded to the undersurface of a seal 50 which closes off the aperture 36. The seal 50, which prevents foreign material from entering the slab 46 and also helps to contain the slab within the case 32, is preferably securely attached to both the stud 38 and the case. Assuming attachment to both of these parts, it is generally desirable that the seal be of a relatively limp material which offers negligible resistance to the movement of the stud 36.

The isolator 28 damps both vertical and horizontal vibrations and shock. Again, it provides damping which is substantially at the critical value. It will be apparent that with the proper dimensions for the foam slabs 46 and 48, critical damping can be provided for both horizontal and vertical motion.

Study of the isolator 28 will make it apparent that the same or a similar construction can be used to isolate a part from torsional vibrations. An important application of a torsional isolator is a rotational shaft coupling where torsional vibrations are to be minimized.

FIG. 3 shows another embodiment of the invention as a vibration and shock isolator. In general the isolator of FIG. 3 is similar to that of FIG. 1 except that the spring 56 has been added. The spring 56 may be selected to support all or a portion of the static load and effectively results in smaller isolators where heavy loads are to be carried by the isolators.

This can also be controlled in the embodiment of FIG. 2 using foams and impregnants of different characteristics and dimensions.

More specifically referring to FIG. 3 the isolator is housed in an inverted cup-shaped case 58 closed off at the bottom plate 51. The case 58 is provided with an upper aperture 59, through which a load-receiving stud 52 extends downwardly into the interior of the isolator. The stud 52, which may be threaded as shown at 53 to facilitate attachment to the housing 26 by means of a screw, not shown, is fastened at its lower end to a load-distributing plate 54. The plate 54, in turn, is sandwiched between impregnated foam slabs, designated as 57, of the same type described above. The load-distributing plate 54 has an opening 55 designed to receive the spring 56 which is prevented from sidewise movement by the projection 60 and the foam 57.

The foam 57 can be bonded to the parts inside the case as described for FIG. 2, except it is not bonded to the spring 56. Furthermore, if desired, the opening 59 could also be closed off by a seal such as the seal 50 of FIG. 2. The isolator of FIG. 3 similarly damps both vertical and horizontal vibration and shock. It also provides damping which is substantially at the critical value. It will be apparent that critical damping can be provided for both vertical and horizontal motion by selection of the various parameters of the foam 57 and spring 56.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what I claim as new and secure by Letters Patent is:

I claim:

1. A vibration and shock isolating system comprising
   (A) a part to be isolated from vibration,
   (B) an isolating medium mechanically coupling said part to a source of vibration,
   (C) said medium being of foam material impregnated with a damping substance,
   (D) said system having its spring constant and damping such as to provide substantially critical damping of shock and vibration.

2. The combination defined in claim 1 in which said foam material is polyurethane.

3. The combination defined in claim 1 in which said damping substance is asphaltic bitumen.

4. The combination defined in claim 1 in which said damping substance is polysulfide.

5. A vibration and shock isolating system comprising
   (A) a part to be isolated from vibrations,
   (B) an isolating medium connected to said part and arranged so that said vibrations pass through said medium to reach said part,
   (C) said isolating medium being of the combination of
      (1) an open-cell foam material, and
      (2) a damping material lining the walls of the cells of said material,
   (D) said system having its spring consant and damping such as to provide substantially critical damping of shock and vibration.

6. A vibration isolating system comprising
   (A) a part to be isolated from vibrations,
   (B) a housing,
   (C) at least a portion of said part being disposed within said housing,
   (D) an isolating medium
      (1) disposed within said housing, and
      (2) mechanically coupling said part to said housing,
   (E) said isolating medium comprising
      (1) a body of open-cell foam material,
      (2) a damping material lining the walls of the cells of said body,
   (F) said system having its spring constant and damping such as to provide substantially critical damping of shock and vibration.

7. The combination defined in claim 6 in which all of the said part is within said housing.

8. The combination defined in claim 6 in which said isolating medium substantially fills the space between said part and said housing.

9. The combination defined in claim 6 in which said part includes a portion inside said housing and a portion outside said housing.

10. A shock mounting system comprising
    (A) a load to be isolated from vibration,
    (B) a housing having an aperture therein,
    (C) a load receiving unit extending through said aperture from the exterior of said housing to the interior thereof,
    (D) a vibration isolating medium,
       (1) disposed within said housing, and
       (2) mechanically coupling said load receiving unit to said housing,
    (E) said isolating medium comprising
       (1) a body of open-cell foam material, and
       (2) a damping material lining the cell walls of the cells of said foam,
    (F) said system having its spring constant and damping such as to provide substantially critical damping of shock and vibration.

11. The combination defined in claim 10 in which said isolating medium
    (A) is bonded to said load receiving unit and said housing over the areas in which it contacts them, and
    (B) substantially fills the space between said load receiving unit and said housing.

12. The combination defined in claim 11 in which said load receiving unit includes, (A) a load receiving stud extending through said aperture, and
(B) a plate disposed within said housing and secured to said stud.

13. The combination defined in claim 12 which further includes a spring coupled between said plate and the bottom of the interior of said housing.

14. Vibration isolating unit comprising,
(A) housing means for containing an isolating medium,
(B) means for coupling said isolating medium to a load,
(C) an isolating medium having a long duration time constant,
(D) said isolating medium made of an open-cell foam material treated with an impregnant which sticks to the walls of the cells of said foam and to itself, and
(E) said foam having cells which are stronger than the adhesive forces between the cells due to said impregnant,
(F) said system having its spring constant and damping such as to provide substantially critical damping of shock and vibration.

15. The combination set forth in claim 14 in which said foam is impregnated with material of the non-hardening visco-elastic type.

16. The combination of claim 14 wherein said foam is open-cell natural rubber impregnated with nonhardening visco-elastic materials of one of the following types:
(1) Polysulfide
(2) Polyisobutylene
(3) Polyisoprene
(4) Polychloroprene
(5) Butadiene-acrylonitrile elastomer
(6) Polyacrylate
(7) Butadiene-styrene elastomer
(8) Silicone elastomer
(9) Polyurethane
(10) Fluorinated elastomer.

17. The combination of claim 14 wherein said foam is open-cell polyurethane impregnated with nonhardening visco-elastic materials of one of the following types:
(1) Polysulfide
(2) Polyisobutylene
(3) Polyisoprene
(4) Polychloroprene
(5) Butadiene-acrylonitrile elastomer
(6) Polyacrylate
(7) Butadiene-styrene elastomer
(8) Silicone elastomer
(9) Polyurethane.
(10) Fluorinated elastomer.

18. The combination of claim 14 wherein said foam is open-cell polyvinyl chloride impregnated with nonhardening visco-elastic materials of one of the following types:
(1) Polysulfide
(2) Polyisobutylene
(3) Polyisoprene
(4) Polychloroprene
(5) Butadiene-acrylonitrile elastomer
(6) Polyacrylate
(7) Butadiene-styrene elastomer
(8) Silicone elastomer
(9) Polyurethane
(10) Fluorinated elastomer.

19. The combination of claim 14 wherein said foam is open-cell silicone rubber impregnated with nonhardening visco-elastic materials of one of the following types:
(1) Polysulfide
(2) Polyisobutylene
(3) Polyisoprene
(4) Polychloroprene
(5) Butadiene-acrylonitrile elastomer
(6) Polyacrylate
(7) Butadiene-styrene elastomer
(8) Silicone elastomer
(9) Polyurethane
(10) Fluorinated elastomer.

References Cited

UNITED STATES PATENTS

| | | | |
|---|---|---|---|
| 2,565,524 | 8/1951 | Rust et al. | 260—2.5 |
| 2,895,603 | 7/1959 | Freeman | 206—46 |
| 2,955,056 | 10/1960 | Knox | 117—98 |
| 2,964,424 | 12/1960 | Mast | 117—98 |
| 3,007,692 | 11/1961 | Kniffin | 248—22 |
| 3,055,297 | 9/1962 | Leeds | 206—46 |
| 3,061,460 | 10/1962 | Schickendanz | 117—98 |
| 3,271,332 | 9/1966 | Bond | 260—2.5 |
| 3,306,967 | 2/1967 | Turrewitsch | 264—321 |

THERON E. CONDON, *Primary Examiner.*

WILLIAM T. DIXSON, Jr., *Examiner.*